(12) United States Patent
Kuffel et al.

(10) Patent No.: US 9,720,198 B2
(45) Date of Patent: Aug. 1, 2017

(54) STRAIN RELIEF FOR ARMORED CABLE

(71) Applicant: Panduit Corp., Tinley Park, IL (US)

(72) Inventors: Gregory L. Kuffel, Plainfield, IL (US);
Wang Xiaodong, Wuxi (CN); Hao Qijin, Kunshan (CN)

(73) Assignee: Panduit Corp., Tinley Park, IL (US)

( * ) Notice: Subject to any disclaimer, the term of this patent is extended or adjusted under 35 U.S.C. 154(b) by 500 days.

(21) Appl. No.: 13/948,294

(22) Filed: Jul. 23, 2013

(65) Prior Publication Data
US 2015/0030303 A1    Jan. 29, 2015

(51) Int. Cl.
| | |
|---|---|
| *G02B 6/38* | (2006.01) |
| *G02B 6/36* | (2006.01) |
| *G02B 6/00* | (2006.01) |
| *G02B 6/44* | (2006.01) |

(52) U.S. Cl.
CPC ......... *G02B 6/4471* (2013.01); *G02B 6/3887* (2013.01); *G02B 6/4477* (2013.01); *G02B 6/4478* (2013.01)

(58) Field of Classification Search
CPC .... G02B 6/4471; G02B 6/4477; G02B 6/443; G02B 6/4478; G02B 6/3887
USPC .......... 385/60, 62, 66, 81, 84, 107, 135, 136
See application file for complete search history.

(56) References Cited

U.S. PATENT DOCUMENTS

| | | |
|---|---|---|
| 3,492,410 A | 1/1970 | Kelly |
| 4,090,029 A | 5/1978 | Lundeberg |
| 4,490,576 A | 12/1984 | Bolante et al. |
| 4,549,755 A | 10/1985 | Kot et al. |
| 4,814,547 A | 3/1989 | Riley et al. |
| 4,885,429 A | 12/1989 | Schnittker |
| 2009/0032282 A1* | 2/2009 | Sedor et al. ................... 174/135 |
| 2010/0186988 A1* | 7/2010 | Jeroense et al. ............. 174/103 |
| 2011/0217016 A1* | 9/2011 | Mullsteff ....................... 385/135 |
| 2014/0355936 A1* | 12/2014 | Bund ................... G02B 6/3825 385/81 |
| 2016/0139346 A1* | 5/2016 | Bund ................... G02B 6/3825 385/56 |

FOREIGN PATENT DOCUMENTS

| | | |
|---|---|---|
| DE | 10110571 A1 | 9/2002 |
| EP | 0978745 A1 | 2/2000 |
| WO | 2013106183 A1 | 7/2013 |

\* cited by examiner

*Primary Examiner* — Kaveh C Kianni
*Assistant Examiner* — Hung Lam
(74) *Attorney, Agent, or Firm* — Christopher S. Clancy; James H. Williams; Christopher K. Marlow

(57) ABSTRACT

A strain relief device for armored fiber optic cable is described. The strain relief device can made up of a boot collet and a collet nut. The boot collet can have a collet, flexible boot, boot collet threads, and a camming surface. The collet nut can have collet nut threads and a collet nut slope. The strain relief device operates by having the camming surface engage the collet nut slope, causing the collet to compress onto the armor sheath when the boot collet threads engage the collet nut threads as the collet nut is tightened onto the boot collet.

4 Claims, 6 Drawing Sheets

STRAIN RELIEF FOR ARMORED CABLE

FIELD OF THE INVENTION

The present invention relates generally to strain relief for fiber optic cables, and more specifically, to strain relief for the termination of armored fiber optic cable.

BACKGROUND OF THE INVENTION

FIG. 1 shows a section of armored fiber optic cable 20. Armored fiber optic cable 20 usually is made up of an armor sheath 22 formed from a durable material such as plastic or metal surrounding an interior fiber cable 24. Often with the use of armored fiber optic cable 20, the interior fiber cable 24 will need to extend past the end of the armor sheath 22 of the cable, such as when the fiber cable is terminated within an enclosure. However, since the armor sheath 22 is generally tough and stiff and the interior fiber cable 24 is flexible and compliant, sharp bends can be induced on the interior fiber cable 24 at the exit point of the armor sheath 22.

SUMMARY OF THE INVENTION

This application describes a strain relief device for armored fiber optic cable. In one embodiment, the strain relief device can be made up of a boot collet and a collet nut. The boot collet can have a collet, flexible boot, boot collet threads, and a camming surface. The collet nut can have collet nut threads and a collet nut slope. The strain relief device operates by having the camming surface engage the collet nut slope, causing the collet to compress onto the armor sheath when the boot collet threads engage the collet nut threads as the collet nut is tightened onto the boot collet.

DETAILED DESCRIPTION OF PREFERRED EMBODIMENTS

FIGS. 2-6 show one embodiment of a strain relief device 10 for armored fiber optic cable 20. The strain relief device 10 is generally made up of two pieces, a boot collet 30 and a removably attached collet nut 40.

Figure 1:
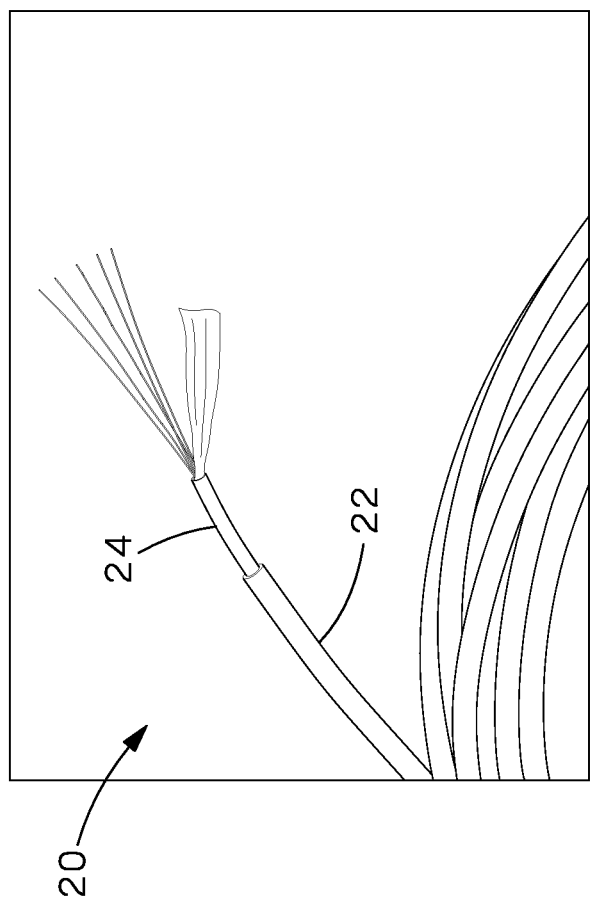
FIG. 1 shows typical armored fiber optic cable.
Figure 2:
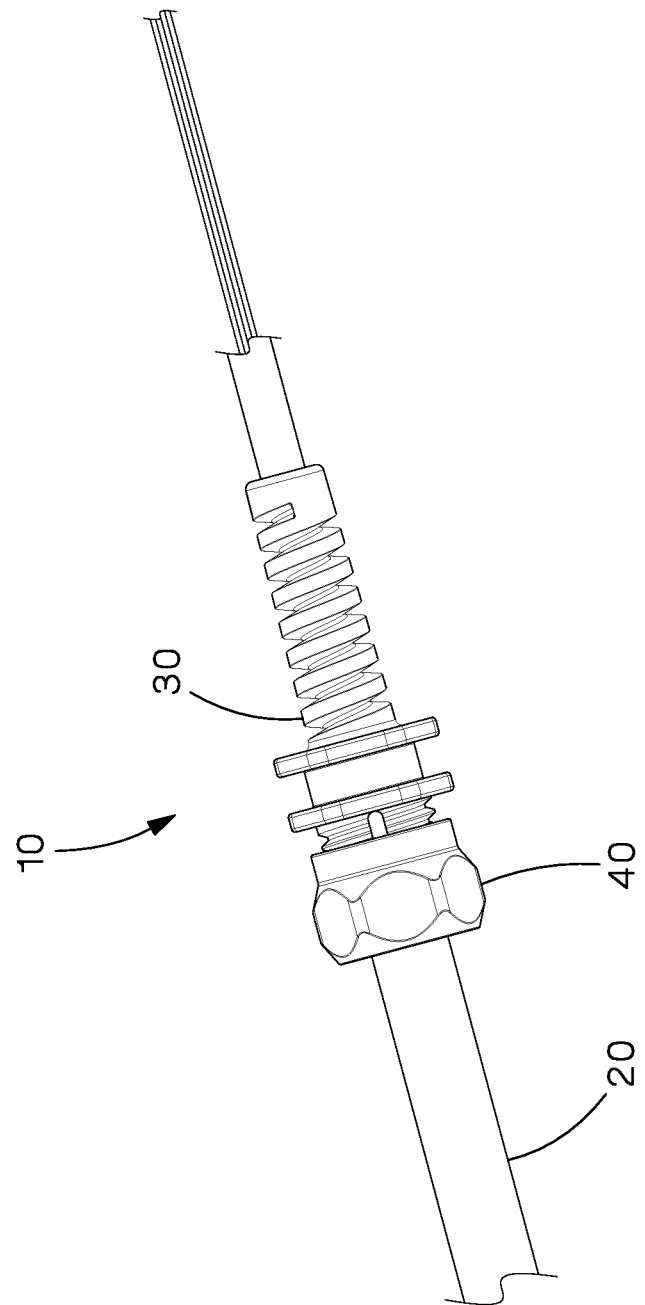
FIG. 2 is a side view of a strain relief device terminating a length of armored cable.
Figure 3:
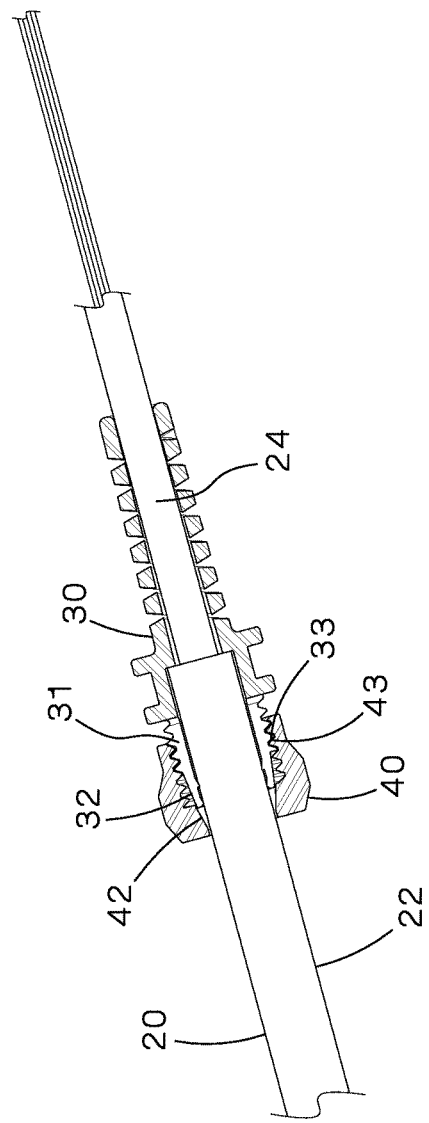
FIG. 3 is a cross-sectional view of the strain relief device of FIG. 2.
Figure 4:
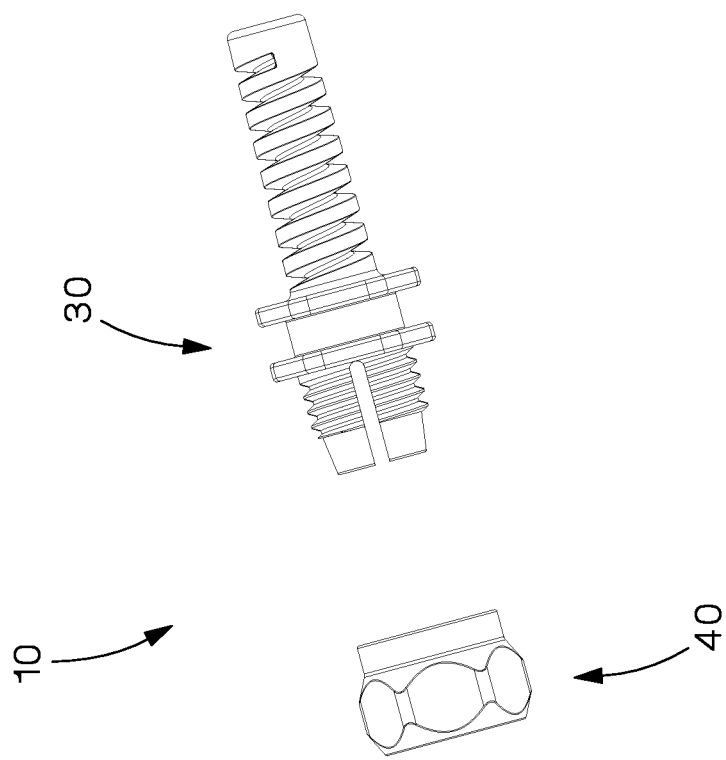
FIG. 4 is a side view of the strain relief device with the collet nut separated from the boot collet.
Figure 5A:
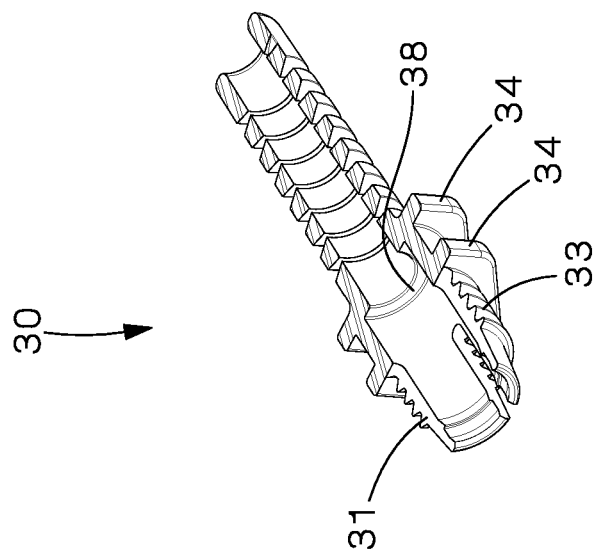
FIG. 5A is a perspective view of the boot collet of the strain relief device.
Figure 5B:
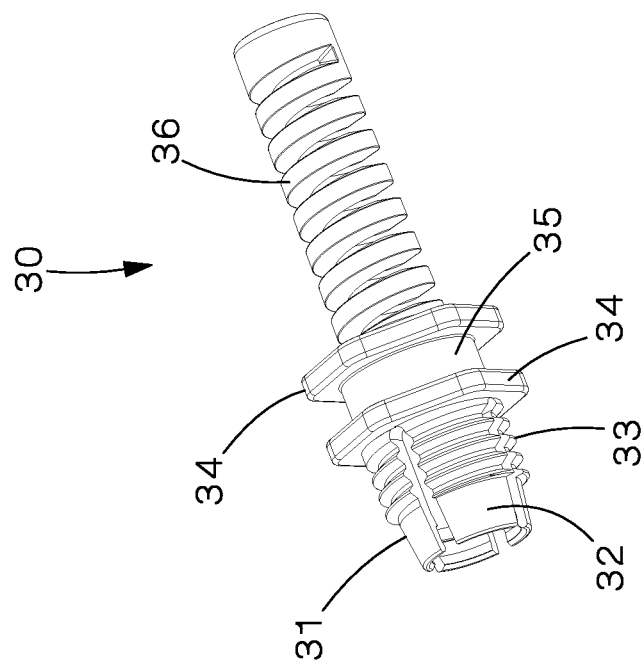
FIG. 5B is a cutaway perspective view of the boot collet.
Figure 6B:
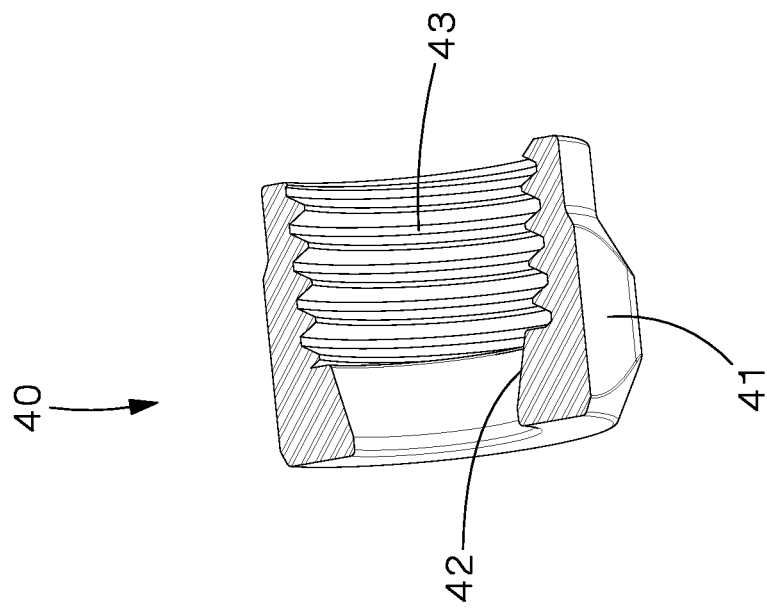
FIG. 6B is a cutaway perspective view of the collet nut.
Figure 6A:
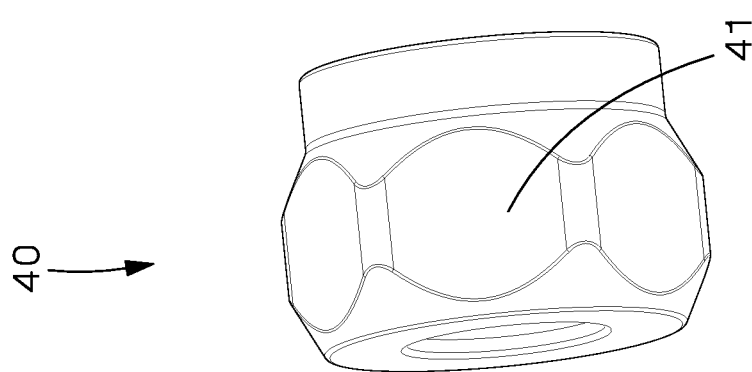
FIG. 6A is a perspective view of the collet nut of the strain relief device.

As best shown in FIGS. 5A and 5B, the boot collet 30 can have a collet 31, a camming surface 32, boot collet threads 33, boot collet hex flanges 34, an accessory mounting surface 35, a flexible boot 36, and an armor stop 38. In one embodiment, the collet nut 40 can have hex flanges 41, collet nut threads 43, and a collet nut slope 42.

The collet 31 of the boot collet 30 compresses onto the armor sheath 22 of the armored fiber optic cable (see FIG. 3) when the collet nut 40 is tightened onto the boot collet 30. The camming surface 32 of the boot collet 30 interacts with the collet nut slope 42 of the collet nut 40 when the collet nut 40 is tightened onto the boot collet 30 (via the interaction between the boot collet threads 33 and the collet nut threads 43) in order to compress the collet 31 onto the armor sheath 22. The boot collet hex flanges 34 and the collet nut hex flanges 41 allow for tightening the collet nut 40 on the boot collet 30 by hand or with the use of a tool, such as a wrench (while this embodiment shows hexagonal shaped flanges, many different shapes can be used). The accessory mounting surface 35 can be can be used to mount an accessory such as a cable tie. The armor stop 38 limits the travel of the armor sheath 22 within the boot collet 30. The flexible boot 36 of the boot collet 30 controls the bend radius of the interior fiber cable 24 after it exits the sheath 22 in order to reduce the possibility of inducing sharp bends on the interior fiber cable 24.

In order to terminate the armored cable 20 using the strain relief device 10, first, the strain relief device 10 is placed at the end of the armor sheath 22 of the armored cable 20, The interior fiber cable 24 is threaded into the collet 31 of the boot collet and out the flexible boot 36. This is performed with the collet nut 40 only slightly threaded onto the boot collet 30 such that the camming surface 32 of the boot collet 30 is not engaged by the collet nut slope 42 of the collet nut 40. Then, the armor sheath 22 of the armored fiber optic cable 20 is inserted into the collet 31 until it engages the armor stop 38. Finally, the collet nut 40 is then tightened onto the boot collet 30 which causes the collet nut slope 42 to engage the camming surface 32 of the boot collet 30 which in turn compresses the collet 31 onto the armor sheath 22 of the armored fiber cable 20.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A strain relief device for armored fiber optic cable, the armored fiber optic cable having an armor sheath surrounding an interior fiber cable, the strain relief device comprising:
    a boot collet having a first end and a second end, the boot collet having a collet on the first end, a flexible boot on the second end, boot collet threads on the first end and a camming surface on the first end; and
    a collet nut, the collet nut configured to be inserted on the first end of the boot collet and having collet nut threads and a collet nut slope wherein the camming surface is configured to engage the collet nut slope causing the collet to compress onto the armor sheath when the boot collet threads engage the collet nut threads as the collet nut is tightened onto the boot collet in a direction towards the second end of the boot collet.

2. The strain relief device of claim 1 further comprising an accessory mounting surface.

3. The strain relief device of claim 1 further comprising flanges.

4. The strain relief device of claim 3 where the flanges are hexoganal flanges.

* * * * *